United States Patent
Takase et al.

(10) Patent No.: US 10,168,861 B2
(45) Date of Patent: Jan. 1, 2019

(54) MENU DISPLAY DEVICE, MENU DISPLAY CONTROL METHOD, PROGRAM AND INFORMATION STORAGE MEDIUM

(75) Inventors: Masaki Takase, Tokyo (JP); Munetaka Tsuda, Kyoto (JP); You Asakura, Tokyo (JP); Takashi Hatakeda, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 198 days.

(21) Appl. No.: 13/880,143

(22) PCT Filed: Oct. 17, 2011

(86) PCT No.: PCT/JP2011/073864
§ 371 (c)(1),
(2), (4) Date: Apr. 18, 2013

(87) PCT Pub. No.: WO2012/053489
PCT Pub. Date: Apr. 26, 2012

(65) Prior Publication Data
US 2013/0212530 A1   Aug. 15, 2013

(51) Int. Cl.
*G06F 3/0482*   (2013.01)
*G06F 3/0488*   (2013.01)
*G06F 3/0485*   (2013.01)

(52) U.S. Cl.
CPC .......... *G06F 3/0482* (2013.01); *G06F 3/0485* (2013.01); *G06F 3/0488* (2013.01)

(58) Field of Classification Search
CPC .............................. G06F 3/0482; G06F 3/0481
USPC ....................................................... 715/815
See application file for complete search history.

(56) References Cited

U.S. PATENT DOCUMENTS

| 7,903,115 | B2 | 3/2011 | Platzer |
| 8,633,949 | B2 | 1/2014 | Rogers |
| 8,881,050 | B2 | 11/2014 | Kim |
| 2007/0132789 | A1 | 6/2007 | Ording |

(Continued)

FOREIGN PATENT DOCUMENTS

| CN | 1802853 A | 7/2006 |
| CN | 101384047 A | 3/2009 |

(Continued)

OTHER PUBLICATIONS

International Preliminary Report on Patentability and Written Opinion for corresponding PCT Application PCT/JP2011/073864, dated May 16, 2013.

(Continued)

*Primary Examiner* — David E Choi
(74) *Attorney, Agent, or Firm* — Matthew B. Dernier, Esq.

(57) ABSTRACT

A menu display device includes: means for displaying on a screen a given range within a menu, in which a plurality of menu items are arranged in an array; means for moving the given range in response to a predetermined operation performed by a user; means for determining whether or not the menu item at an end within the menu is displayed in a predetermined position of the screen; and means for changing, when the menu item at the end is displayed in the predetermined position of the screen, the space between the menu items displayed on the screen in response to the predetermined operation performed by the user.

6 Claims, 6 Drawing Sheets

(56) References Cited

U.S. PATENT DOCUMENTS

| | | | |
|---|---|---|---|
| 2007/0146337 A1 | 6/2007 | Ording | |
| 2008/0165210 A1 | 7/2008 | Platzer | |
| 2009/0070711 A1* | 3/2009 | Kwak | G06F 3/0485 715/829 |
| 2011/0010659 A1* | 1/2011 | Kim | G06F 3/0485 715/784 |
| 2011/0090255 A1* | 4/2011 | Wilson | G06F 3/04817 345/647 |
| 2011/0109635 A1 | 5/2011 | Platzer | |
| 2011/0145730 A1* | 6/2011 | Zhou | G06F 17/30902 715/760 |
| 2012/0066644 A1 | 3/2012 | Mizutani | |
| 2013/0212530 A1* | 8/2013 | Takase | G06F 3/0488 715/815 |
| 2013/0222312 A1 | 8/2013 | Rogers | |

FOREIGN PATENT DOCUMENTS

| CN | 102474290 A | 5/2012 |
|---|---|---|
| EP | 2034399 A2 | 3/2009 |
| EP | 2454818 A2 | 5/2012 |
| EP | 2488934 A2 | 8/2012 |
| JP | 2000172403 A | 6/2000 |
| JP | 2009518758 A | 5/2009 |
| JP | 2010515973 A | 5/2010 |
| JP | 2012063862 A | 3/2012 |
| WO | 2007067858 A2 | 6/2007 |
| WO | 2011007994 A2 | 1/2011 |
| WO | 2011046766 | 4/2011 |

OTHER PUBLICATIONS

Office Action for corresponding JP Application No. 2010-235964, dated Jul. 8, 2014.
International Search Report for corresponding PCT Application PCT/JP2011/073864, dated Dec. 27, 2011.
Office Action for corresponding CN Application No. 2011800508649, dated Jun. 1, 2015.
European Search Report for corresponding EP Application 11834328, 9 pages, dated Jul. 19, 2016.
European Office Action for corresponding EP Application 11834328. 4, 5 pages, dated Jan. 26, 2017.
Office Action for corresponding CN Application 2011800508649, 6 pages, dated Jan. 11, 2016.
Office Action for corresponding CN Application 2011800508649, 7 pages, dated May 4, 2016.

* cited by examiner

| ITEM NUMBER n | SPACE Δn | COORDINATE Xn |
|---|---|---|
| 1 | 30 | 10 |
| 2 | 30 | 60 |
| 3 | 20 | 110 |
| 4 | 20 | 140 |
| 5 | 20 | 170 |
| 6 | 20 | 200 |
| 7 | 20 | 230 |
| 8 | — | 260 |

FIG.11

MENU DISPLAY DEVICE, MENU DISPLAY CONTROL METHOD, PROGRAM AND INFORMATION STORAGE MEDIUM

TECHNICAL FIELD

The present invention relates to a menu display device, a menu display method, a program, and an information storage medium, and more particularly, to an improvement of a user interface for menu display.

BACKGROUND ART

In a case where a large number of menu items such as search results, titles of news articles, or file names within a storage device are displayed on a screen, there is often employed a user interface technology for displaying on the screen a partial area within a menu, in which a plurality of menu items are arrayed in accordance with a predetermined criteria relating to an attribute such as a name or a date, and moving the partial area in response to a scrolling operation. In a case where a touch screen is used as the screen, the examples of the scrolling operation include dragging or a flick. According to this user interface, a user can cause an arbitrary area within the menu to be displayed on the screen with the scrolling operation.

SUMMARY OF INVENTION

Technical Problem

However, according to the above-mentioned user interface technology, when a menu is scrolled to display a menu item at an end on a screen, a user cannot immediately grasp whether or not the currently displayed menu item is one at the end. For example, in a case where the menu is scrolled downward to display the menu item at a lower end on the screen, the user has no other way to understand that the menu item at the lower end is being currently displayed on the screen on the grounds that contents of the screen do not change even when the scrolling operation is performed further downward.

The present invention has been made in view of the above-mentioned problem, and an object thereof is to provide a menu display device, a menu display control method, a program, and an information storage medium which allow a user to immediately understand that a menu item at an end has been displayed on a screen.

Solution to Problem

In order to solve the above-mentioned problem, a menu display device according to the present invention includes: menu displaying means for displaying on a screen a given range within a menu, in which a plurality of menu items are arranged in an array; range moving means for moving the given range in response to a predetermined operation performed by a user; determination means for determining whether or not the menu item at an end within the menu is displayed in a predetermined position of the screen; and space changing means for changing, when the menu item at the end is displayed in the predetermined position of the screen, an space between the menu items displayed on the screen in response to the predetermined operation performed by the user.

In addition, the space changing means may widen the space between the menu items displayed on the screen. At this time, the space changing means may widen at least the space between the menu item at the end and the menu item adjacent thereto. Further, the space changing means may keep the menu item at the end within the array displayed in the predetermined position of the screen, and move the menu item adjacent thereto. In addition, the space changing means may widen the space between the menu items displayed on the screen, and then cause the space to return to a predetermined distance.

Further, a menu display control method according to the present invention includes the steps of: displaying on a screen a given range within a menu, in which a plurality of menu items are arranged in an array; moving the given range in response to a predetermined operation performed by a user; determining whether or not the menu item at an end within the menu is displayed in a predetermined position of the screen; and changing, when the menu item at the end is displayed in the predetermined position of the screen, an space between the menu items displayed on the screen in response to the predetermined operation performed by the user.

Further, a program according to the present invention is a program for causing a computer to function as: means for displaying on a screen a given range within a menu, in which a plurality of menu items are arranged in an array; means for moving the given range in response to a predetermined operation performed by a user; means for determining whether or not the menu item at an end within the menu is displayed in a predetermined position of the screen; and means for changing, when the menu item at the end is displayed in the predetermined position of the screen, an space between the menu items displayed on the screen in response to the predetermined operation performed by the user. This program may be stored in a computer-readable information storage medium such as a CD-ROM, a DVD-ROM, or a memory card.

DESCRIPTION OF EMBODIMENTS

Now, an embodiment of the present invention is described in detail with reference to the accompanying drawings.

Figure 1:
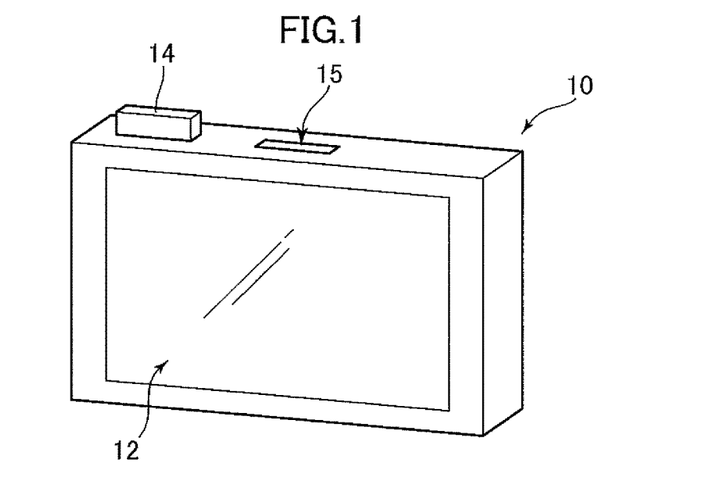
FIG. 1 An external perspective view of a portable information processing device according to an embodiment of the present invention.
Figure 2:
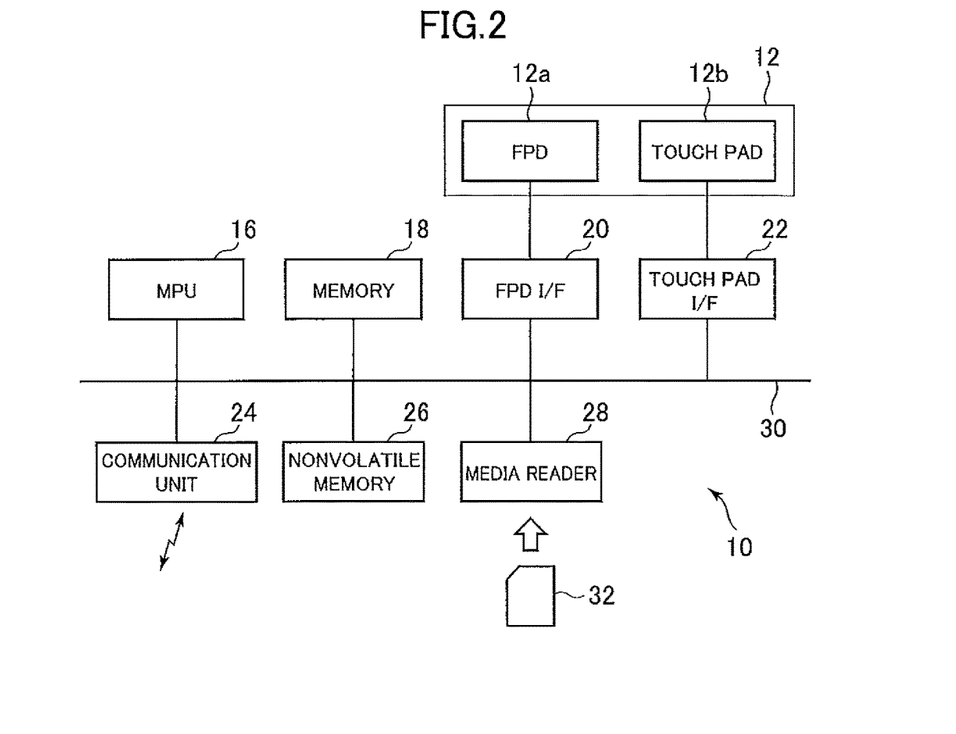
FIG. 2 A hardware configuration diagram of the portable information processing device according to the embodiment of the present invention.

FIG. 1 is an external perspective view of a portable information processing device according to the embodiment of the present invention, and FIG. 2 is a hardware configuration diagram of the portable information processing device. A portable information processing device 10 illustrated in those figures represents an embodiment of a menu display device according to the present invention, and a control method therefor represents an embodiment of a menu display control method according to the present invention. Further, a program executed on the portable information processing device 10 represents an embodiment of a program according to the present invention. The portable information processing device 10 is a computer system including a casing having a thin box shape as illustrated in FIG. 1, and has a front surface, a large part of which is occupied by a touch surface of a touch panel 12, and a side surface provided with a power button 14 and a memory card slot 15. This portable information processing device 10 is driven by a chargeable internal battery (not shown).

As illustrated in FIG. 2, the portable information processing device 10 includes an MPU 16, a memory 18, an FPD interface 20, a touch pad interface 22, a communication unit 24, a nonvolatile memory 26, and a media reader 28, which are connected to a bus 30 and enabled to transmit/receive data to one another. As described above, the portable information processing device 10 includes the touch panel 12. This touch panel 12 includes a flat panel display (FPD) 12a using liquid crystal or organic electro-luminescence (EL) and a touch pad 12b of a capacitive type or other such type. The FPD interface 20 is connected to the FPD 12a, and the touch pad interface 22 is connected to the touch pad 12b. The memory 18 is used as a work space for the MPU 16. The FPD interface 20 includes a memory for saving an image to be displayed on the FPD 12a, periodically outputs the image stored in the memory to the FPD 12a, and updates the image to be displayed by the FPD 12a. The touch pad interface 22 periodically performs an arithmetic operation for a touched position based on a signal output from the touch pad 12b, and provides the touched position to the MPU 16. The communication unit 24 is connected to a data communication network such as the Internet, and has a function of transmitting and receiving data. The nonvolatile memory 26 is storage means having a larger capacity than the memory 18, and stores an operating system and various application programs. The media reader 28 reads data from a computer-readable information storage medium such as a memory card 32, and writes data into such a computer-readable information storage medium.

On this portable information processing device 10, a program for displaying a menu that can be scrolled in response to a user operation is executed. This program may be a part of the operating system, or may be an application program such as an image viewer for displaying a large number of images or a search program for displaying a large number of search results. Further, this program may be stored in the nonvolatile memory 26 in advance, or may be downloaded through the communication unit 24 before being stored in the nonvolatile memory 26. Further, the program may be copied from the memory card 32 to the nonvolatile memory 26, or a program stored in the memory card 32 may be executed directly by the MPU 16.

Figure 6:
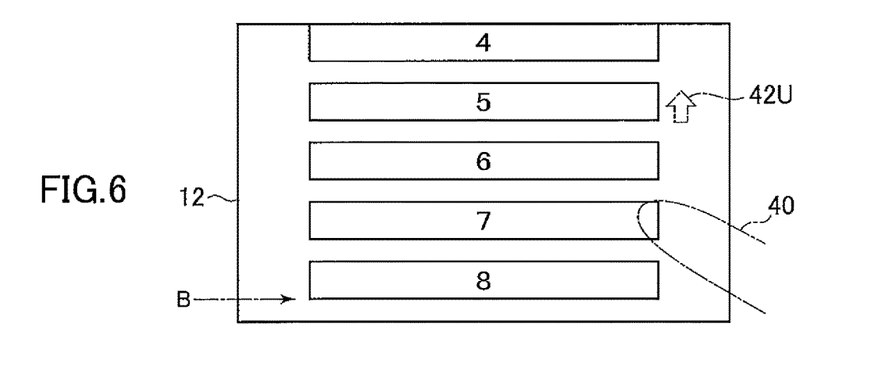
FIG. 6 A diagram illustrating the screen during the menu scrolling.
Figure 7:
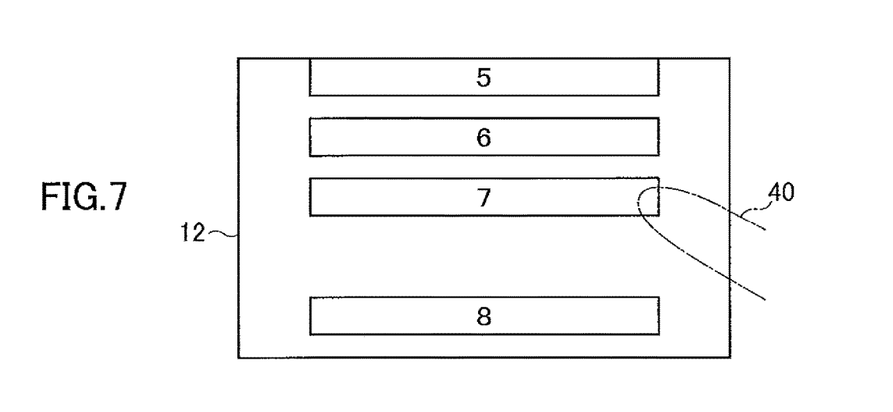
FIG. 7 A diagram illustrating the screen during end processing.
Figure 8:
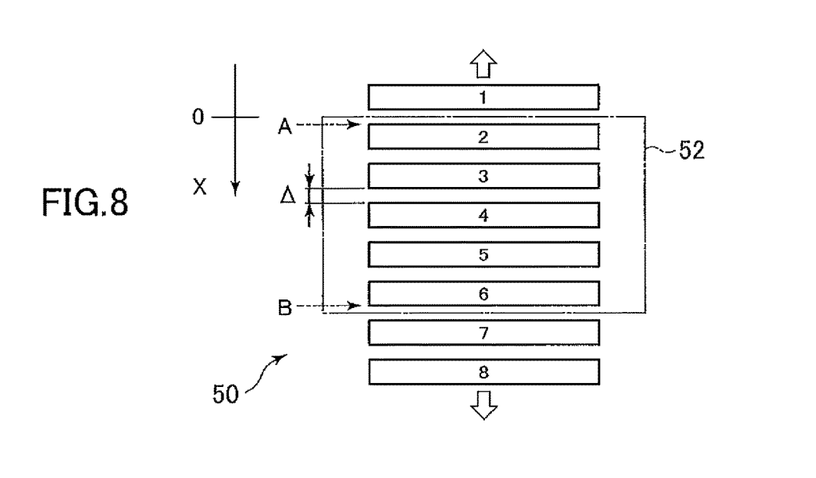
FIG. 8 An explanatory diagram of a concept of the menu scrolling.

FIGS. 3 to 7 illustrate the menu displayed on the touch panel 12 during menu scrolling. Further, FIG. 8 is a diagram illustrating a relationship between the menu and a display range that covers a part thereof. As illustrated in FIG. 8, in this embodiment, a menu 50 displayed on the touch panel 12 includes, as an example, rectangular menu item images 1 to 8 that extend in a horizontal direction. Examples of the menu item images 1 to 8 include representations of the titles of electronic mail arrayed in an order of reception dates, representations of the titles of music data arrayed in an order of acquisition, and thumbnails of image data arrayed in a photograph order. Those eight menu item images 1 to 8 are virtually arrayed vertically in the stated order at reference spaces Δ. In other words, the menu item image 1 is placed at an upper end of the menu 50, and the menu item image 8 is placed at the lower end. Further, the menu 50 is placed so as to vertically pass through a range displayed on the touch panel 12, in other words, the display range 52, and the menu 50 is moved virtually vertically through the display range 52 in response to the user operation. With this configuration, menu item images in an arbitrary part are located within the display range 52, and those menu item images are displayed on the touch panel 12. However, the menu 50 has a limited movement range, and is allowed to move downward until the upper edge of the menu item image 1 reaches a position (position A) lower than the upper edge of the display range 52 by a predetermined distance and allowed to move upward until the lower edge of the menu item image 8 reaches a position (position B) upper than the lower edge of the display range 52 by a predetermined distance. Further, each of spaces between the menu item images 1 to 8 is allowed to become wider than the reference space Δ.

Figure 3:
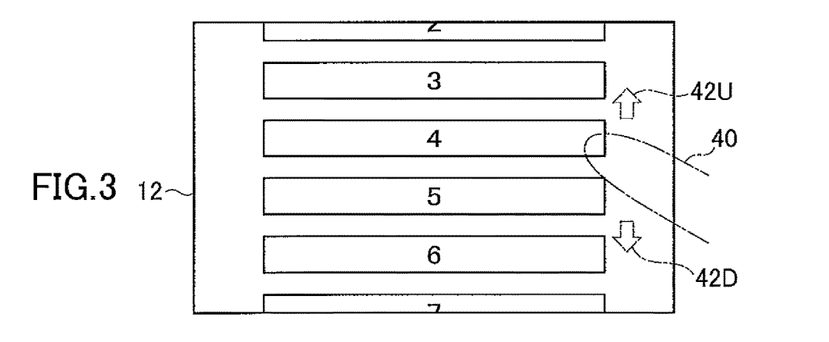
FIG. 3 A diagram illustrating a screen during menu scrolling.
Figure 4:
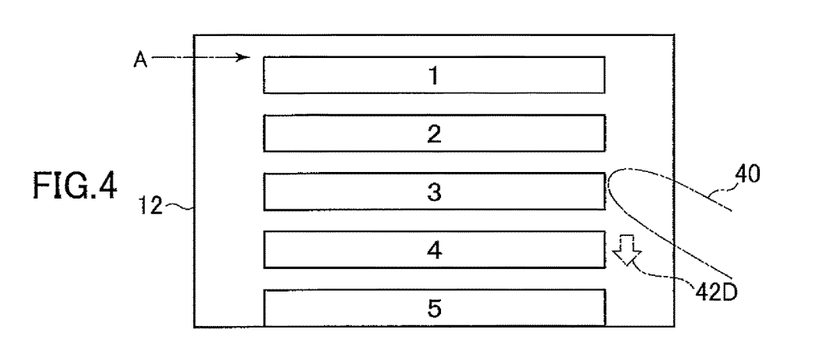
FIG. 4 A diagram illustrating the screen during the menu scrolling.
Figure 5:
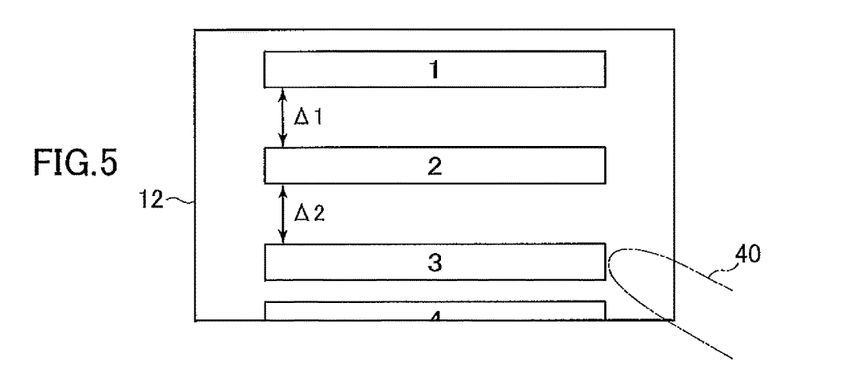
FIG. 5 A diagram illustrating the screen during end processing.

Specifically, as illustrated in FIG. 3, in a state in which the menu item images 2 to 7 are displayed on the touch panel 12, when a user slides (drags) his/her fingertip 40 in a downward direction indicated by an arrow 42D with the fingertip 40 kept touching the touch surface, the menu 50 is moved downward relatively to the display range 52 in accordance with a sliding amount, which displays the menu item images 1 to 5 on the touch panel 12 as illustrated in FIG. 4. In this state, the menu 50 has moved down to a lower limit, and the upper edge of the menu item image 1 is in the position A. In this state, when the user further slides the fingertip 40 in the downward direction indicated by the arrow 42D with the fingertip 40 kept touching an area in which the menu item image 3 is displayed on the touch surface, as illustrated in FIG. 5, an space Δ1 between the menu item image 1 and the menu item image 2 and an space Δ2 between the menu item image 2 and the menu item image 3 are widened in accordance with the sliding amount. That is, with regard to the menu item image 3 that is displayed in the touched position of the fingertip 40 and the menu item images 1 and 2 placed above the menu item image 3, those spaces Δ1 and Δ2 are widened. On the other hand, the other spaces are not widened. Note that, in FIGS. 4 and 5, a display position of the menu item image 1 placed at the upper end of the menu 50 is unchanged. When the touched position is slid upward, the spaces Δ1 and Δ2 become narrower in accordance with the sliding amount, and when the touched position is slid downward, the spaces Δ1 and Δ2 are further widened in accordance with the sliding amount. Further, when the fingertip 40 is released from the touch surface, each space gradually returns to the reference space Δ. In FIG. 5, the space Δ1 between the menu item image 1 and the menu item image 2 and the space Δ2 between the menu item image 2 and the menu item image 3 may be the same, or the space Δ1 between the menu item image 1 and the menu item image 2 may be narrower than the space Δ2 between the menu item image 2 and the menu item image 3. In addition, distances of spaces Δ between the menu item images may be set stepwise in accordance with distances from the touched position. With this configuration, in FIG. 5, the space Δ2 is set larger than the space Δ1. This allows the user to operate the menu more intuitively while being aware of the end of the menu items.

In the same manner, as illustrated in FIG. 3, in a state in which the menu item image 2 to 7 are displayed on the touch panel 12, when a user slides (drags) his/her fingertip 40 in an upward direction indicated by an arrow 42U with the fingertip 40 kept touching the touch surface, the menu 50 is moved upward relatively to the display range 52 in accordance with a sliding amount, which displays the menu item image 4 to 8 on the touch panel 12 as illustrated in FIG. 6. In this state, the menu 50 has moved up to an upper limit, and the menu item image 8 is in the screen position B. In this state, when the user further slides the fingertip 40 in the upward direction indicated by the arrow 42U with the fingertip 40 kept touching the touch surface, as illustrated in FIG. 7, an space between the menu item image 8 and the menu item image 7 is widened in accordance with the sliding amount. That is, with regard to the menu item image 7 that is displayed in the touched position of the fingertip 40 and the menu item image 8 placed below the menu item image 7, the space is widened. On the other hand, the other spaces are not widened. Note that, in FIGS. 6 and 7, a display position of the menu item image 8 placed at the lower end of the menu 50 is unchanged. When the touched position is slid downward, the space becomes narrower in accordance with the sliding amount, and when the touched position is slid upward, the space is further widened in accordance with the sliding amount. Further, when the fingertip 40 is released from the touch surface, the space gradually returns to the reference space Δ.

Further, in this embodiment, it is detected that the user has flicked the touch panel 12 with the fingertip 40, and when it is detected that a downward flick has been performed, the menu 50 is moved downward through the display range 52 (automatic scrolling). The flick is an operation for sliding the fingertip 40 on the touch surface at a speed equal to or higher than a predetermined reference speed with the fingertip 40 kept touching the touch surface and going on to release the fingertip 40 from the touch surface. After the flick, the fingertip 40 of the user is released from the touch surface of the touch panel 12, while the menu 50 keeps moving downward. In this case, as a sliding speed at a time of the flick becomes faster, an initial speed of movement becomes faster. Further, as time elapses, the moving speed of the menu 50 becomes slower, and the movement is finally stopped. Note that, the spaces between the menu item image 1 to 8 may be widened when a flick operation is performed. In this case, as the sliding speed at the time of the flick becomes faster, the spaces between the menu item images 1 to 8 may become wider. Further, when the upper edge of the menu item image 1 reaches the position A during such the automatic scrolling, the spaces between the menu item image 1 to 8 gradually become wider. After that, the spaces gradually become narrower, and when each space returns to the reference space Δ, a screen stops changing.

In the same manner, when it is detected that an upward flick has been performed, the menu 50 is moved upward through the display range 52. After the flick, the fingertip 40 of the user is released from the touch surface of the touch panel 12, while the menu 50 keeps moving upward. Also in this case, as a sliding speed at a time of the flick becomes faster, an initial speed of movement becomes faster. Further, as time elapses, the moving speed of the menu 50 becomes slower, and the movement is finally stopped. Further, when the lower edge of the menu item image 8 reaches the position B during such the automatic scrolling, the spaces between the menu item images 1 to 8 gradually become wider. After that, the spaces gradually become narrower, and when each space returns to the reference space Δ, the screen stops changing.

As described above, when the upper edge of the menu item image 1 reaches the position A in the operation (flick or dragging) for moving the menu 50 downward, the menu item image 1 does not move further downward, and instead, the space between the menu item image 1 and the menu item image 2 becomes wider. In the same manner, when the lower edge of the menu item image 8 reaches the position B in the operation (flick or dragging) for moving the menu 50 upward, the menu item image 8 does not move further upward, and instead, the space between the menu item image 8 and the menu item image 7 becomes wider. In this manner, it is possible to make it easier for the user to understand that the menu 50 has reached the lower limit or the upper limit, that is, the menu item image 1 at the upper end or the menu item image 8 at the lower end is displayed on the touch panel 12 in a predetermined position.

Figure 9:
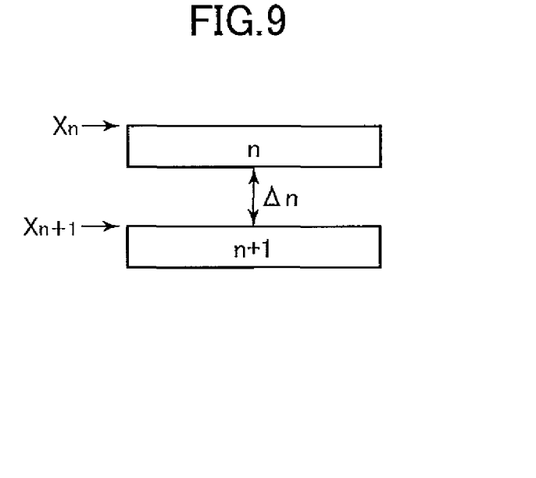
FIG. 9 A diagram illustrating definitions of respective variables managed during menu display.
Figure 10:
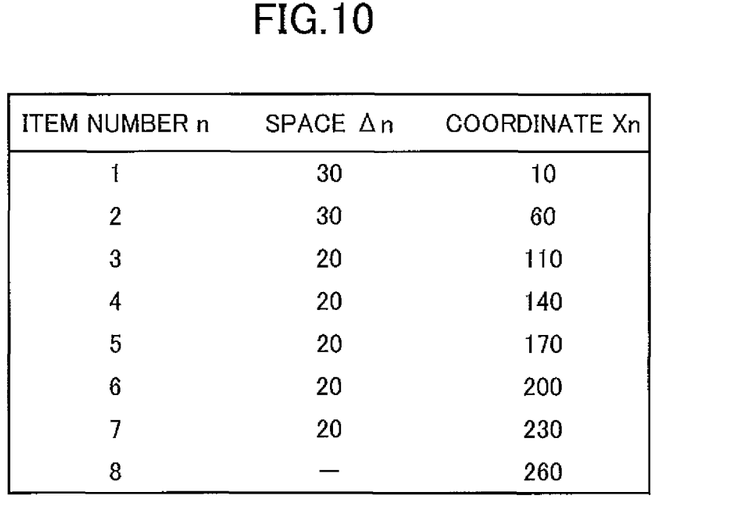
FIG. 10 A diagram illustrating a table stored during the menu display.

Next, processing for displaying the menu 50 is described in more detail. FIG. 9 illustrates definitions of respective variables managed by the portable information processing device 10 during display of the menu 50, and FIG. 10 schematically illustrates a table stored in the memory 18 of the portable information processing device 10 during the display of the menu 50. As illustrated in those figures, during the display of the menu 50, spaces Δ1 to Δ7 between the menu item image 1 to 7 and the menu item images 2 to 8 located therebelow, respectively, are stored in the memory 18 in association with the menu item images 1 to 7, respectively. Specifically, the space Δn is an space between the lower end of a menu item image n and the upper edge of a menu item image n+1 (n=1 to 7). Further, coordinates X1 to X8 of the display position are stored in the memory 18 in association with the menu item images 1 to 8,respectively. A coordinate Xn indicates, as illustrated in FIGS. 8 and 9, a distance between the upper edge of the screen of the touch panel 12 and the upper edge of the menu item image n. Note that, when the coordinate Xn is negative, this coordinate is out of the display range 52 (n=1 to 8).

Figure 11:
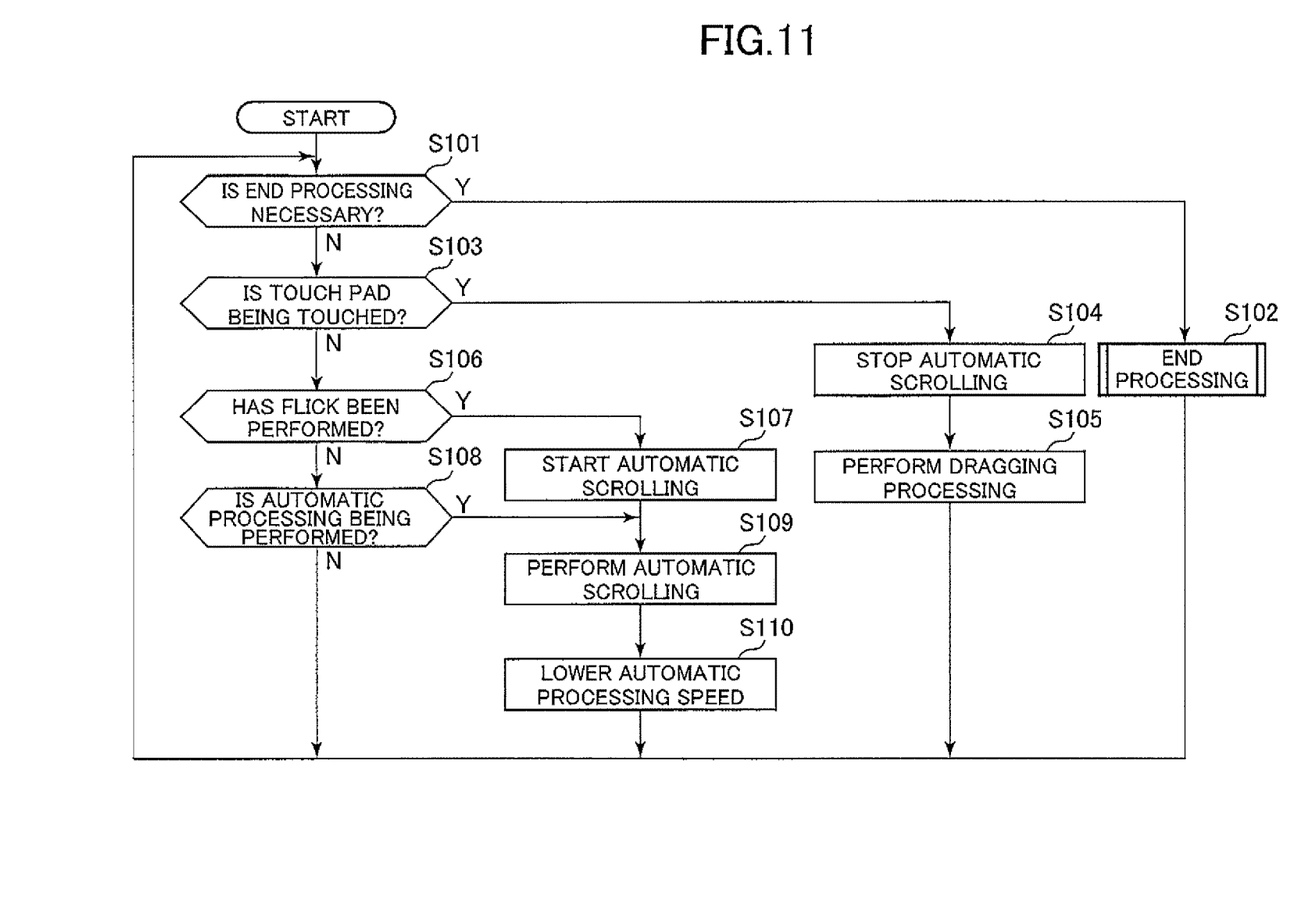
FIG. 11 A flowchart illustrating information processing for the menu display.
Figure 12:
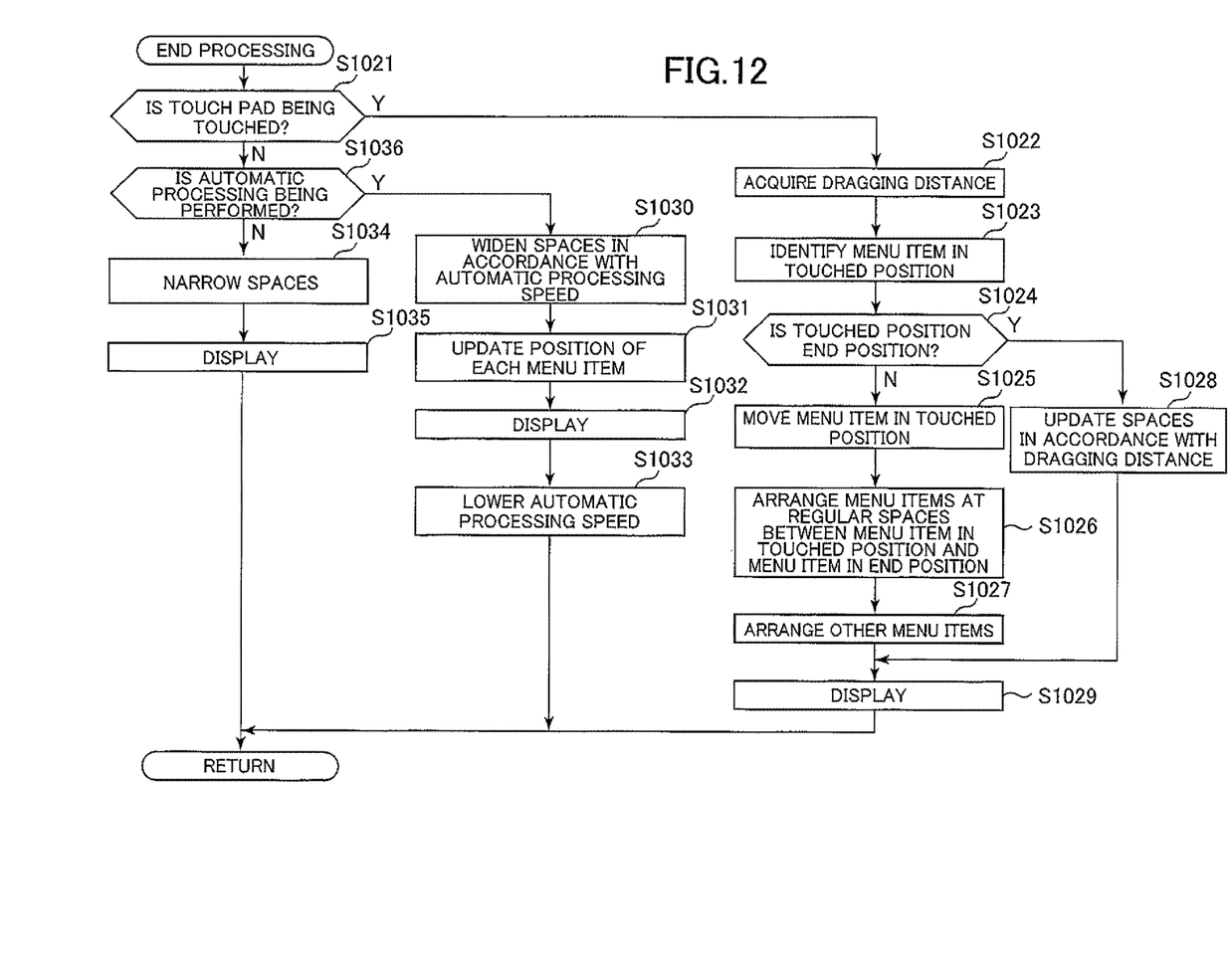
FIG. 12 A flowchart illustrating the information processing for the menu display.

FIGS. 11 and 12 illustrate processing for the program for displaying the menu 50. As illustrated in FIG. 11, in this program, it is first determined whether or not end processing is necessary (S101). The end processing is processing illustrated by a flowchart of FIG. 12 and executed after the upper edge of the menu item image 1 reaches the position A in the operation for moving the menu 50 downward or after the lower edge of the menu item image 8 reaches the position B in the operation for moving the menu 50 upward. Specifically, it is determined that the end processing is necessary (1) when a downward dragging operation is performed in a state in which the upper edge of the menu item image 1 is in the position A, (2) when an upward dragging operation is performed in a state in which the lower edge of the menu item image 8 is in the position B, (3) when the upper edge of the menu item image 1 reaches the position A in automatic processing corresponding to a downward flick operation, (4) when the lower edge of the menu item image 8 reaches the position B in the automatic processing corresponding to an upward flick operation, (5) when the current space Δ1 between the menu item image 1 and the menu item image 2 is larger than the reference space Δ in the state in which the upper edge of the menu item image 1 is in the position A, and (6) when the current space Δ7 between the menu item image 8 and the menu item image 7 is larger than the reference space Δ in the state in which the lower edge of the menu item image 8 is in the position B.

In this case, it can be determined based on the coordinates X1 and X8 stored in the table of FIG. 10 whether or not the upper edge of the menu item image 1 is in the position A and whether or not the lower edge of the menu item image 8 is in the position B. Further, whether or not the dragging operation has been performed and a direction of the dragging operation can be determined based on an output from the touch pad interface 22. In addition, in this program, an automatic processing speed corresponding to the flick operation is stored in the memory 18, and when the automatic processing speed is higher than 0, it can be determined that downward automatic processing is being performed by the flick operation (the automatic processing is being performed). Alternatively, when the automatic processing speed is smaller than 0, it can be determined that the upward automatic processing is being performed by the flick operation (the automatic processing is being performed). On the other hand, when the automatic processing speed is 0, it can be determined that the automatic processing is not being performed.

When the end processing is not necessary, it is then determined based on the output from the touch pad interface 22 whether or not the touch pad 12b is being touched (S103). When the touch pad 12b is being touched, the automatic processing speed is set to 0 (S104), and a vertical distance between the most recently detected touched position and the currently detected touched position, in other words, a dragging distance is acquired to move the menu 50 by this dragging distance (S105). Specifically, when the touched position has moved upward, the dragging distance is subtracted from each coordinate Xn included in the table illustrated in FIG. 10. Further, when the touched position has moved downward, the dragging distance is added to each coordinate Xn. Then, the menu item image 1 to 8 are displayed on the FPD 12a based on the updated table, and the procedure returns to the processing of Step S101.

When it is determined in Step S103 that the touch pad 12b is not being touched, it is determined whether or not the flick has been performed (S106). For example, it is determined that the flick has been performed when the vertical distance between the most recently detected touched position and the second most recently detected touched position, in other words, the most recent dragging distance (sliding speed) is equal to or larger than a predetermined distance and when no currently touched position has been detected.

When it is determined that the flick has been performed, the automatic processing speed is set in accordance with the most recent dragging distance (S107). Specifically, as the dragging distance becomes longer, the automatic processing speed is set higher. Further, when the dragging is performed downward, the automatic processing speed is set to a positive value, and when the dragging is performed upward, the automatic processing speed is set to a negative value.

After that, the value of the automatic processing speed is added to the coordinate Xn included in the table of FIG. 10, and the menu item image 1 to 8 are displayed on the FPD 12a based on the updated table (S109). In addition, the value of the automatic processing speed is caused to become closer to 0 (S110). For example, the automatic processing speed may be caused to become closer to 0 by a predetermined value at a time. When the automatic processing speed becomes 0 as a result of the processing of Step S110, the automatic processing is brought to an end. After that, the procedure returns to the processing of Step S101.

When it is determined in Step S106 that the flick has not been performed, it is determined whether or not the automatic processing is being currently performed (S108). Specifically, it is determined that the automatic processing is not being performed when the automatic processing speed is 0, and otherwise, it is determined that the automatic processing is being performed. When the automatic processing is not being performed, the procedure directly returns to the processing of Step S101, and when the automatic processing is being performed, the procedure advances to the processing of Step S109.

When it is determined in Step S101 that the end processing is necessary, the end processing illustrated in FIG. 12 is executed. In this processing, it is first determined whether or not the touch pad 12b is being touched (S1021). When the touch pad 12b is being touched, a difference between the most recently touched position and the currently touched position, in other words, the dragging distance is acquired (S1022). In addition, the menu item image corresponding to the currently touched position is identified (S1023). For example, after calculating the vertical distances between the currently touched position and center positions of the menu item images 1 to 8, one that has the smallest distance may be set as the menu item image corresponding to the currently touched position. Then, it is determined whether or not the identified menu item image is any one of the menu item image 1 and the menu item image 8 (S1024). When the identified menu item image is any one of the menu item image 1 and the menu item image 8, the spaces Δ1 to Δ7 included in the table of FIG. 10 are updated in accordance with the dragging distance acquired in Step S1022, and the coordinates X1 to X8 are updated as well (S1028). Specifically, when the upper edge of the menu item image 1 is in the position A and when the dragging is being performed downward, the spaces Δ1 to Δ7 are widened by an amount that is proportionate to the dragging distance. When the dragging is being performed upward, the spaces Δ1 to Δ7 are caused to become narrower by an amount that is proportionate to the dragging distance. The amount by which the spaces Δ1 to Δ7 are caused to become wider or narrower may be set equal to one another. After that, with the coordinate X1 maintaining the same value, the coordinates X2 to X8 are updated based on the coordinate X1 and the spaces Δ1 to Δ7. That is, the upper edge of the menu item image 1 is placed in the position A, and the other menu item images 2 to 8 are arrayed at the spaces Δ1 to Δ7.

In the same manner, when the lower edge of the menu item image 8 is in the position B and when the dragging is being performed upward, the spaces Δ1 to Δ7 are widened by an amount that is proportionate to the dragging distance. When the dragging is being performed downward, the spaces Δ1 to Δ7 are caused to become narrower by an amount that is proportionate to the dragging distance. Also in this case, the amount by which the spaces Δ1 to Δ7 are caused to become wider or narrower may be set equal to one another. After that, with the coordinate X8 maintaining the same value, the coordinates X1 to X7 are updated based on the coordinate X8 and the spaces Δ1 to Δ7. That is, the lower edge of the menu item image 8 is placed in the position B, and the other menu item images 1 to 7 are arrayed at the spaces Δ1 to Δ7.

On the other hand, when it is determined in Step S1024 that the identified menu item image is neither the menu item image 1 nor the menu item image 8, the identified menu item image is then moved (S1025). In other words, the coordinate Xn regarding the menu item image identified in Step S1023 is moved by the dragging distance acquired in Step S1022.

In this case, when the dragging is being performed downward, the dragging distance is added to the coordinate Xn, and when the dragging is being performed upward, the dragging distance is subtracted from the coordinate Xn.

In addition, the menu item images are arranged at regular spaces between the menu item image identified in Step S1023 and the menu item image 1 or the menu item image 8 (S1026). In other words, when the upper edge of the menu item image 1 is in the position A, the space $\Delta n$ and the coordinate Xn within the table illustrated in FIG. 10 are updated so that the menu item images are placed at regular spaces between the menu item image identified in Step S1023 and the menu item image 1. Further, when the lower edge of the menu item image 8 is in the position B, the space $\Delta n$ and the coordinate Xn within the table illustrated in FIG. 10 are updated so that the menu item images are placed at regular spaces between the menu item image identified in Step S1023 and the menu item image 8.

Note that, in Step S1026, the space between the menu item images may be gradually changed between the menu item image identified in Step S1023 and the menu item image 1 or the menu item image 8. For example, as has already been described with reference to FIG. 5, as the distance from the menu item image identified in Step S1023 becomes longer, the space between the menu item images may be caused to become narrower.

In addition, based on the space $\Delta n$ and the coordinate Xn updated in Step S1026, the remaining coordinates Xn that have not been updated in Step S1026 are updated (S1027). That is, when the upper edge of the menu item image 1 is in the position A, the menu item images below the menu item image identified in Step S1023 are arrayed at the spaces $\Delta n$ recorded in the table of FIG. 10. In the same manner, when the lower edge of the menu item image 8 is in the position B, the menu item images above the menu item image identified in Step S1023 are arrayed at the spaces $\Delta n$ recorded in the table of FIG. 10. After that, the menu item image 1 to 8 are displayed on the FPD 12a based on the table updated as described above (S1029).

When it is determined in Step S1021 that the touch pad 12b is not being touched, it is then determined whether or not the automatic processing is being performed (S1036). When the automatic processing is being performed, the spaces $\Delta 1$ to $\Delta 7$ are caused to become wider in accordance with a level of the current automatic processing speed (S1030). For example, a value proportionate to an absolute value of the automatic processing speed may be added to the spaces $\Delta 1$ to $\Delta 7$. Note that, the spaces $\Delta 1$ to $\Delta 7$ maybe widened evenly, or may be widened to extents different from one another. For example, when the upper edge of the menu item image 1 is in the position A, the space (that is, $\Delta 1$) closer to the menu item image 1 may be caused to become wider. That is, $\Delta > \Delta 2 > \Delta 3$ ... may be satisfied. Further, when the lower edge of the menu item image 8 is in the position B, the space closer to the menu item image 8 maybe caused to become wider. That is, $\Delta 8 > \Delta 7 > \Delta 6$ ... maybe satisfied. On the other hand, when the upper edge of the menu item image 1 is in the position A, the space farther from the menu item image 1 maybe caused to become wider. That is, $\Delta 8 > \Delta 7 > \Delta 6$ ... maybe satisfied. Further, when the lower edge of the menu item image 8 is in the position B, the space farther from the menu item image 8 may be caused to become wider. That is, $\Delta 1 > \Delta 2 > \Delta 3$ ... maybe satisfied. Then, the coordinates X2 to X8 are updated based on the spaces $\Delta 1$ to $\Delta 7$ updated in Step S1030 (S1031). In this manner, with the menu item image 1 maintained in the same position, the menu item images 1 to 8 are arrayed at the updated spaces $\Delta 1$ to $\Delta 7$. After that, the menu item image 1 to 8 are displayed on the FPD 12a based on the table updated as described above (S1032). In addition, the automatic processing speed is caused to become closer to 0 (S1033). For example, the automatic processing speed may be caused to become closer to 0 by a predetermined value at a time. When the automatic processing speed becomes 0 as a result of the processing of Step S1033, the automatic processing is brought to an end.

Further, when it is determined in Step S1025 that the automatic processing is not being performed, the spaces $\Delta 1$ to $\Delta 7$ are caused to become closer to the original reference space $\Delta$. For example, the spaces $\Delta 1$ to $\Delta 7$ may be caused to become closer to the reference space $\Delta$ by a predetermined value. In addition, the coordinates X1 to X8 are updated so that the menu item image 1 to 8 are arrayed at the updated spaces $\Delta$ to $\Delta 7$ (S1034). Specifically, when the upper edge of the menu item image 1 is in the position A, with the coordinate X1 maintaining the same value, the coordinates X2 to X8 are updated so that the menu item image 1 to 8 are arrayed at the updated spaces $\Delta 1$ to $\Delta 7$. Further, when the lower edge of the menu item image 8 is in the position B, with the coordinate X8 maintaining the same value, the coordinates X1 to X7 are updated so that the menu item image 1 to 8 are arrayed at the updated spaces $\Delta 1$ to $\Delta 7$. After that, the menu item image 1 to 8 are displayed on the FPD 12a based on the table updated as described above (S1035).

According to the portable information processing device 10 described above, when the upper edge of the menu item image 1 reaches the position A in the downward flick or dragging, the menu item image 1 does not move further downward, and instead, the space between the menu item image 1 and the menu item image 2 becomes wider. Further, when the lower edge of the menu item image 8 reaches the position B in the upward flick or dragging, the menu item image 8 does not move further upward, and instead, the space between the menu item image 8 and the menu item image 7 becomes wider. In this manner, it is possible to make it easier for the user to understand that the menu 50 has reached the lower limit or the upper limit, that is, the menu item image 1 at the upper end or the menu item image 8 at the lower end is displayed on the touch panel 12 in the predetermined position.

Note that, the present invention is not limited to the above-mentioned embodiment. For example, the processing illustrated in FIGS. 9 to 12 is merely an example, and it should be understood that a user interface according to the present invention may be realized by another modified processing.

The invention claimed is:

1. A menu display device, comprising:
   a menu displaying unit configured to display on a screen a given range within a menu, in which a plurality of menu items are arranged in an array;
   a range moving unit configured to move the given range in response to a scrolling operation performed by a user;
   a determination unit configured to: (i) determine whether or not a first end menu item at a first end within the menu is displayed in a first predetermined position of the screen, and (ii) determine whether or not a second end menu item at a second end within the menu, opposite to the first end, is displayed in a second predetermined position of the screen; and
   a space changing unit configured to change spaces between respective menu items displayed on the screen in response to the scrolling operation performed by the user, such that: (i) when the first end menu item at the first end is displayed in the first predetermined position of the screen, a first space between the first end menu item and an adjacent menu item, and a second space between the adjacent menu item and a next adjacent menu item, are widened, and (ii) when the second end menu item at the second end is displayed in the second predetermined position of the screen, a third space between the second end menu item and a prior adjacent menu item is widened, but a fourth space between the prior adjacent menu item and a next prior adjacent menu item is not widened.

2. The menu display device according to claim 1, wherein the space changing unit widens the spaces between at least some of the menu items displayed on the screen, and then causes the spaces to return to a predetermined distance.

3. A menu display control method, comprising the steps of:
  displaying on a screen a given range within a menu, in which a plurality of menu items are arranged in an array;
  moving the given range in response to a scrolling operation performed by a user;
  determining whether or not a first end menu item at a first end within the menu is displayed in a first predetermined position of the screen;
  determining whether or not a second end menu item at a second end within the menu, opposite to the first end, is displayed in a second predetermined position of the screen; and
  changing spaces between respective menu items displayed on the screen in response to the scrolling operation performed by the user, such that: (i) when the first end menu item at the first end is displayed in the first predetermined position of the screen, a first space between the first end menu item and an adjacent menu item, and a second space between the adjacent menu item and a next adjacent menu item, are widened, and (ii) when the second end menu item at the second end is displayed in the second predetermined position of the screen, a third space between the second end menu item and a prior adjacent menu item is widened, but a fourth space between the prior adjacent menu item and a next prior adjacent menu item is not widened.

4. A computer including a processor executing a computer program, which causes the computer to carry out actions, comprising:
  displaying on a screen a given range within a menu, in which a plurality of menu items are arranged in an array;
  moving the given range in response to a scrolling operation performed by a user;
  determining whether or not a first end menu item at a first end within the menu is displayed in a first predetermined position of the screen;
  determining whether or not a second end menu item at a second end within the menu, opposite to the first end, is displayed in a second predetermined position of the screen; and
  changing spaces between respective menu items displayed on the screen in response to the scrolling operation performed by the user, such that: (i) when the first end menu item at the first end is displayed in the first predetermined position of the screen, a first space between the first end menu item and an adjacent menu item, and a second space between the adjacent menu item and a next adjacent menu item, are widened, and (ii) when the second end menu item at the second end is displayed in the second predetermined position of the screen, a third space between the second end menu item and a prior adjacent menu item is widened, but a fourth space between the prior adjacent menu item and a next prior adjacent menu item is not widened.

5. A non-transitory, computer readable information storage medium having stored thereon a program, which when executed by a computer, causes the computer to carry out actions, comprising:
  displaying on a screen a given range within a menu, in which a plurality of menu items are arranged in an array;
  moving the given range in response to a scrolling operation performed by a user;
  determining whether or not a first end menu item at a first end within the menu is displayed in a first predetermined position of the screen;
  determining whether or not a second end menu item at a second end within the menu, opposite to the first end, is displayed in a second predetermined position of the screen; and
  changing spaces between respective menu items displayed on the screen in response to the scrolling operation performed by the user, such that: (i) when the first end menu item at the first end is displayed in the first predetermined position of the screen, a first space between the first end menu item and an adjacent menu item, and a second space between the adjacent menu item and a next adjacent menu item, are widened, and (ii) when the second end menu item at the second end is displayed in the second predetermined position of the screen, a third space between the second end menu item and a prior adjacent menu item is widened, but a fourth space between the prior adjacent menu item and a next prior adjacent menu item is not widened.

6. The menu display device according to claim 1, wherein the first space between the first end menu item and the adjacent menu item, and the second space between the adjacent menu item and the next adjacent menu item, are widened to substantially similar square areas.

* * * * *